UNITED STATES PATENT OFFICE.

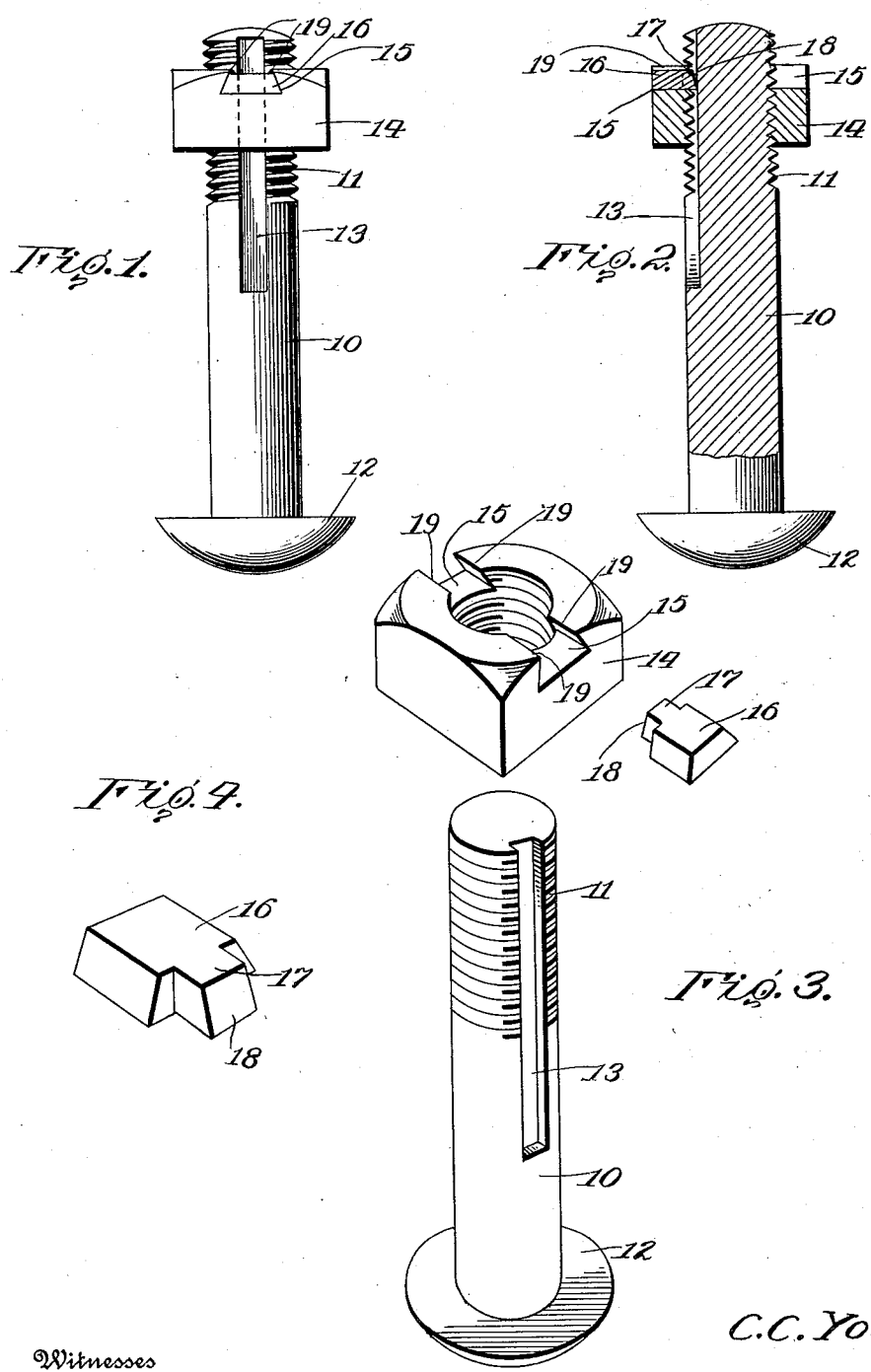

CHAMP C. YOUNG, OF McCLUSKY, ILLINOIS, ASSIGNOR OF ONE-THIRD TO JOHN F. CHAPPELL AND ONE-THIRD TO HENRY H. McCLUSKY, OF McCLUSKY, ILLINOIS.

NUT-LOCK.

1,070,094. Specification of Letters Patent. Patented Aug. 12, 1913.

Application filed February 25, 1911. Serial No. 610,903.

*To all whom it may concern:*

Be it known that I, CHAMP C. YOUNG, citizen of the United States, residing at McClusky, in the county of Jersey and State of Illinois, have invented certain new and useful Improvements in Nut-Locks, of which the following is a specification.

This invention relates to an improvement in nut locks, and has for an object to provide a simple device for interlocking the nut upon the bolt without weakening the same, and to provide a structure which can be readily interlocked and released, as required.

The invention further contemplates a nut lock wherein a slight depression is formed in one side and longitudinally of the bolt, and in which the nut is provided with undercut or dovetail recesses of slight depth in its outer face to receive therein a correspondingly shaped key having a projection for snug engagement in a longitudinal groove formed in the side of the bolt.

For a full understanding of the invention and the merits thereof and also to acquire a knowledge of the details of construction, reference is to be had to the following description and accompanying drawings, in which:

Figure 1 is a side elevation of the assembled nut lock; Fig. 2 is a longitudinal central section taken through the same; Fig. 3 is an enlarged perspective view of the nut lock having the parts thereof removed from the bolt; and, Fig. 4 is a detail enlarged perspective view of the key employed.

Corresponding and like parts are referred to in the following description and indicated in all the views of the drawing by the same reference characters.

Referring to the drawing the numeral 10 designates a bolt, the same having a threaded portion 11 and a head 12. One side of the bolt 10 is provided with a longitudinal groove or channel 13 interrupting the threaded portion 11 and extending to the extremity of the bolt. A nut 14 is disposed over the threaded portion 11 of the bolt, the nut being provided with oppositely disposed and radially extending dovetail slots 15 terminating in the sides of the nut 14. The slots 15 open at their inner ends into the centrally threaded opening of the nut and are adapted to alternately register with the groove 13 in the bolt. A key 16 of dovetail form is fitted in one of the slots 15, the same binding tightly therein to prevent its displacement. The inner end of the key is provided with a projection 17 of angular cross section to fit within the longitudinal groove 13 of the bolt.

From Fig. 2 it will be noted that the key 16 is of a length corresponding to the length of the slot 15, and that the projection 17 is of a length equal to the depth of the groove 13. This arrangement provides a nut lock in which there are no extensions or the like beyond the walls of the nut or about the bolt. The inner end of the key 16, forming the projection 17, is formed angular in cross section for the purpose of snugly engaging against the opposite flattened wall of the groove 13 while the edges of the key are inclined so as to engage beneath the undercut sides of the dovetail slots 15. It is of course understood that the bolt 10 may be elongated and form a truss rod, a stay-bolt or any other member employed in binding objects together.

In the use of the nut lock it is only necessary to rotate the nut upon the bolt to the desired position, or approximately so, as the nut is provided with two of the dovetail slots 15 which register alternately with the groove 13 of the bolt upon each half revolution of the nut. In this manner it is only necessary to provide one groove in the bolt, the weakest member of the lock, and wherein the groove need only be slight. The nut is provided with the two slots which are of slight depth and which do not materially decrease the strength of the nut as they need only interrupt one convolution of the interior thread of the nut. The end of the projection 17 is beveled, as at 18, to present a foreshortened upper face to the key 16 admitting of the insertion of a sharp instrument between the same and the inner wall of the depression 13 to force the key 16 from the nut 14. A further advantage obtained by beveling the projection 17 of the key is that it provides a cutting edge adapted to bite the threads of the bolt in case the nut cannot be conveniently turned to bring its slot in registration with the slot of the bolt. Furthermore, this permits the use of the nut upon unslotted bolts if desired, while it may be employed upon slotted bolts either by seating it in the slot of the bolt or by engaging it with the threads thereof. If deemed necessary, two keys may be employed, one seating in the slot and the other engaging the threads of the nut. When the bolt is in use in such a place that the nut will oftentimes have to be removed, the key is preferably seated in the slot, while on the other hand, if the nut and bolt are to remain permanently in place, the key will preferably be inserted through the opposite end of the nut slot to bite the threads of the bolt and form a permanent lock.

It will be observed from Figs. 1 and 2 that the key 16 is relatively flat to dispose its upper face below the face of the nut 14, and that the marginal upper edges 19 of the slots 15 are flanged inwardly over the key 16 to bind the same in position.

Having thus described the invention, what is claimed is:

The combination with a bolt having a groove extending longitudinally therein at its threaded end, of a nut having a diametrically disposed slot in its outer face, the side walls of which diverge inwardly, and a key having beveled sides corresponding to the beveled walls of the slot and reduced at its inner end to engage in the groove of the bolt, the inner end of said reduced terminal of the key being knife edged transversely for biting engagement with the threads of the bolt if the nut cannot be turned to bring its slot in registration with the slot of the bolt.

In testimony whereof I affix my signature in presence of two witnesses.

CHAMP C. YOUNG. [L. S.]

Witnesses:
 FRANK E. STELLE,
 WILLIAM PATTON.

---

Copies of this patent may be obtained for five cents each, by addressing the "Commissioner of Patents, Washington, D. C."